United States Patent [19]

Kubota et al.

[11] 3,917,221
[45] Nov. 4, 1975

[54] HIGH-PRESSURE-DROP VALVE

[75] Inventors: Shokichi Kubota, Matsudo; Tadahiro Akiyama, Ichikawa, both of Japan

[73] Assignee: Tokico Ltd., Kawasaki, Japan

[22] Filed: Aug. 16, 1974

[21] Appl. No.: 498,225

[30] Foreign Application Priority Data
Aug. 20, 1973   Japan.............................. 48-93150

[52] U.S. Cl. .............. 251/127; 137/625.37; 138/42
[51] Int. Cl.² ........................................ F16K 47/08
[58] Field of Search ................ 138/40, 42; 251/127; 137/625.28, 625.3, 625.33, 625.37, 625.38, 625.39

[56] References Cited
UNITED STATES PATENTS

| | | | |
|---|---|---|---|
| 344,724 | 6/1886 | Crosby........................ | 137/625.38 X |
| 3,112,764 | 12/1963 | Anderson.................... | 137/625.39 X |
| 3,253,401 | 5/1966 | Wells.............................. | 138/42 X |
| 3,514,074 | 5/1970 | Self................................ | 251/127 |
| 3,645,298 | 2/1972 | Roberts et al. ............... | 138/40 |
| 3,648,718 | 3/1972 | Curran......................... | 137/625.37 X |
| 3,722,854 | 3/1973 | Parola........................... | 251/127 |
| 3,771,554 | 11/1973 | Hassal........................... | 137/625.3 X |
| 3,813,079 | 5/1974 | Baumann et al. ............ | 251/127 |
| 3,821,968 | 7/1974 | Barb ............................. | 137/625.3 |

FOREIGN PATENTS OR APPLICATIONS

| | | | |
|---|---|---|---|
| 1,650,409 | 10/1970 | Germany ...................... | 137/625.37 |
| 350,716 | 6/1931 | United Kingdom............ | 138/42 |

Primary Examiner—Henry T. Klinksiek
Attorney, Agent, or Firm—Waters, Schwartz & Nissen

[57] ABSTRACT

A high-pressure drop valve of the type having a valve body or casing and a valve chamber therewithin, a hollow cylindrical cage being fixedly accommodated within the valve chamber and a valve member being slidably fitted within the hollow interior of the cage. A plurality of cage units are fitted successively together in a concentric, substantially liquid-tight manner and respectively having a plurality of orifices formed therein, the orifices of each cage unit being adapted to communicate with corresponding orifices of the other cage units. The cage, made up of a plurality of cage units with a plurality of orifices, constitutes throttling means afforded by the cooperative action of the orifices. Accordingly, as a fluid passes through the orifices of successive cage units, its pressure is reduced in successive multiple stages thereby to obtain a total high pressure drop.

5 Claims, 9 Drawing Figures

HIGH-PRESSURE-DROP VALVE

BACKGROUND OF THE INVENTION

The present invention relates generally to a high-pressure-drop valve and more particularly to a high-pressure-drop valve in which the throttling part is provided in multistage form, and a high pressure difference or drop is created between the liquid inlet and outlet of the valve device.

In a conventional high-pressure-drop valve, pressure reduction of a liquid is accomplished by a throttling section at a single region formed between a plug and a seat ring thereby to achieve a high pressure drop. By this arrangement, a high pressure drop develops in a locally concentrated manner at that throttling section and gives rise to cavitation. As a consequence, erosion develops extensively at parts such as the plug, the seat ring, and the throttling section, and the resulting wear of these parts is rapid. Consequently, the seviceable life of the valve device is short.

Furthermore, since the conventional high-pressure-drop valve is adapted to attain a high pressure drop with a throttling section at a single region, it is accompanied by the problem of vibration and noise which is unavoidably generated.

SUMMARY OF THE INVENTION

Accordingly, it is a general object of the present invention to provide a novel and useful high-pressure-drop valve in which the above described various difficulties accompanying the prior art have been overcome.

A specific object of the invention is to provide a high-pressure-drop valve in which the throttling part thereof is formed in multiple stages in order to obtain a high pressure drop between the liquid inlet and outlet of the valve device. By this provision according to the invention, the liquid is caused to undergo progressive pressure reduction in multiple stages, wherefore cavitation does not develop, and severe wear of the valve device due to erosion does not occur. Furthermore, generation of vibration and noise in the valve device is also suppressed.

Another object of the invention is to provide a high-pressure-drop valve of a construction wherein a plurality of hollow cylindrical cages having mutually different diameters and respectively having a large number of orifices are fitted to each other, and pressure drop is accomplished in multiple stages through these cages.

Still another object of the invention is to provide a high-pressure-drop valve having a desired, non-linear flowrate characteristic.

Other objects and further features of the invention will be apparent from the following detailed description with respect to preferred embodiments of the invention when read in conjunction with the accompanying drawings.

DETAILED DESCRIPTION

Figure 1:
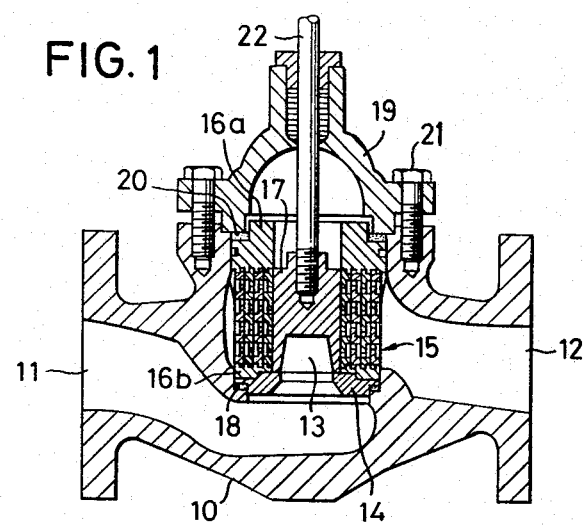
FIG. 1 is a side elevation, in longitudinal section, of a first embodiment of the high-pressure-drop valve according to the invention.
Figure 2:
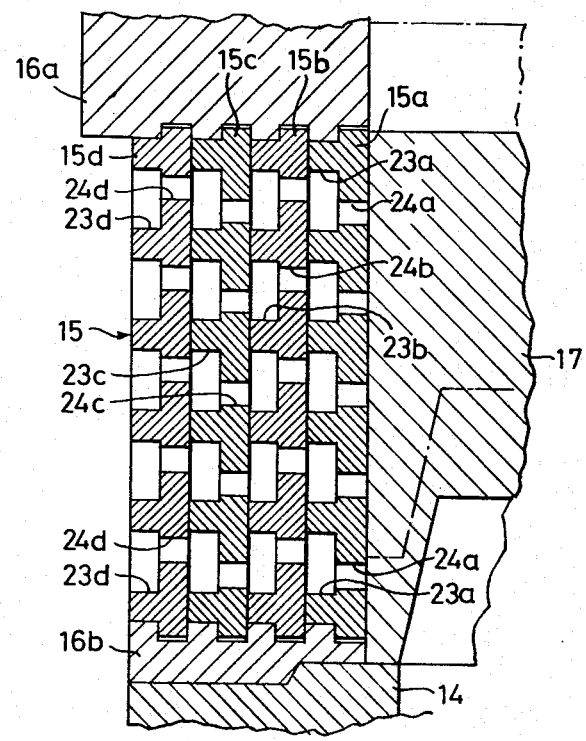
FIG. 2 is an enlarged elevation view, in longitudinal section, showing the cage forming the throttling part of the valve illustrated in FIG. 1.
Figure 3:
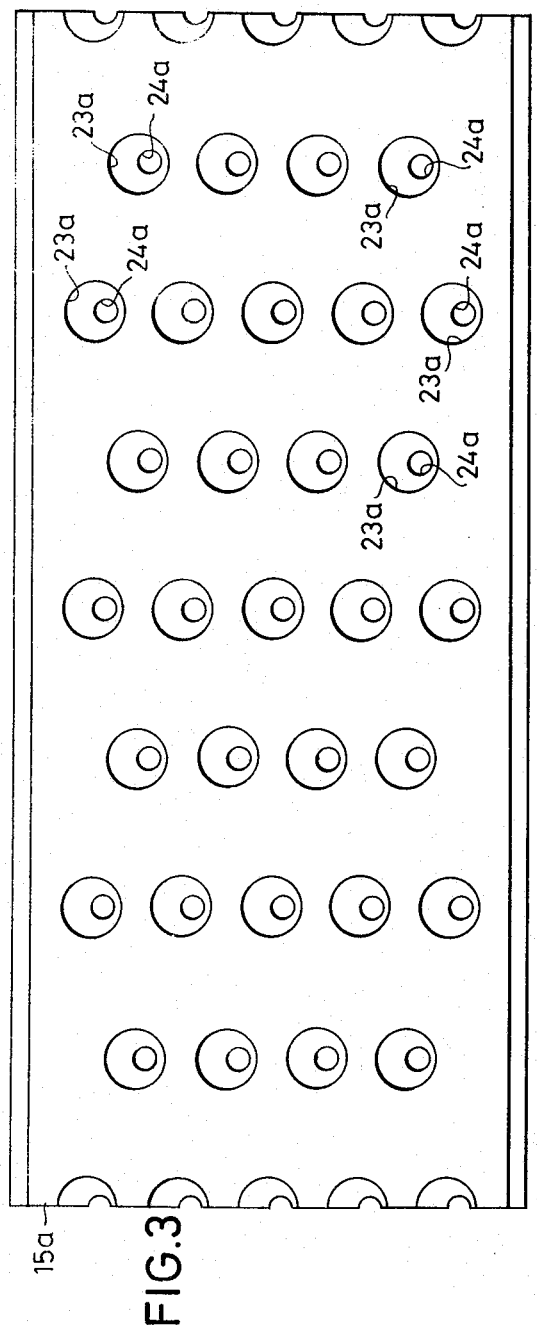
FIG. 3 is a developed elevation view showing one unit of the cage shown in FIG. 2.

Referring first to FIGS. 1, 2, and 3, the first embodiment of the high-pressure-drop valve according to the present invention has a valve body 10 having two ends at which a liquid inlet 11 and a liquid outlet 12 are respectively provided and having at its central part a valve chamber 13 communicating with the liquid inlet and outlet. On the side of the valve chamber 13 communicating with the liquid inlet 11, a valve seat 14 is mounted on the valve body 10 over a packing 18 interposed therebetween.

Within the valve chamber 13, a cage 15 constituting an essential part of the high-pressure-drop valve of the invention is accommodated and fixedly held at top and bottom by cage adapters 16a and 16b. The cage 15 comprises four hollow cylindrical cage units 15a, 15b, 15c, and 15d. Each of these cage units is provided with orifices as described hereinafter.

A plug 17 is slidably (in the vertical direction as viewed in FIG. 1) fitted in the central hollow part of the cage 15. A bonnet 19 is secured by bolts 21 to the valve body 10 over a gasket 20 interposed therebetween. A stem 22 fixed at its lower or inner end to the upper central part of the plug 17 extends upwardly through and beyond the bonnet 19 and is coupled at its upper end to an actuator (not shown) operated manually or by remote control.

In the cage unit 15a of the above mentioned cage 15, as shown in the development view in FIG. 3, there are provided a plurality of holes 23a of relatively large diameter extending partly through the peripheral wall of the unit and a plurality of orifices 24a of relatively small diameter communicating respectively with the holes 23a and extending through the rest of the thickness of the unit wall to the opposite side, thereby forming through holes. These orifices 24a and holes 23a have positional relationships such that each orifice 24a communicates with its respective hole 23a at the lower part thereof.

The number of holes 23a alined in the horizontal direction (line direction as opposed to column direction) is the same (four in the embodiment illustrated) in each line, while five or four holes are alined in the vertical (column) direction, the five-hole columns and four-hole columns being in alternate arrangement. Furthermore, each hole 23a in one column is at the middle point between two holes respectively in the adjacent columns on each side as viewed horizontally, and these holes are somewhat overlapping in the horizontal direction. The number of holes per line and the number of lines disposed at equal spacing intervals in the vertical direction (nine lines in the instant embodiment) are not limited to those of this embodiment but, of course, may be selected to suit the conditions.

In the cage unit 15c, holes 23c and orifices 24c are also formed with the same positional relationship as that of the holes orifices 24a of the cage unit 15a. In the cage units 15b and 15d, holes 23b and 23d of relatively large diameter and orifices and 24d of relatively small diameter are formed, but the orifices 24d are positioned to communicate with their respective holes 23d at the upper parts thereof.

In constituting the cage 15, the cage units 15a through 15d are so fitted that, as indicated in FIG. 2, the holes 23a communicate with respective orifices 24b, the holes 23b with respective orifices 24c, and the holes 23d with respective orifices 24d. The orifices 24a are open at the inner peripheral surface, and the holes 23d are open at the outer peripheral surface of the cage 15. Furthermore, the centers of the orifices of mutually adjacent cage units do not lie on one and the same line but are alternately staggered as indicated in FIG. 2.

The ratio $m$ of the diameters of a hole 23 and its orifice 24 is selected in accordance with the following equation.

$$(\pi/4) d^2 / \pi D\delta \geq m \cong 3,$$

where:

$D$ is the diameter of the hole 23 (23a through 23d);

$d$ is the diameter of the orifice 24 (24a through 24d); and $\delta$ is the gap between adjacent cage units 15a through 15d. By thus selecting $m$ at 3 or a higher value, the ratio of the flow pressure drop of the liquid flowing out through the orifice 24 and the flow pressure drop of the liquid leaking out between adjacent cage units from the peripheral edge of the hole 23 becomes 1:9 or more, and the quantity of leakage of the liquid from the peripheral edge of the hole 23 can be neglected.

The high-pressure-drop valve device of the above described construction according to the invention operates as follows.

In the case where the plug 17 is at its lowermost position and is seated on the valve seat 14 as indicated in full lines in FIG. 2, the outer cylindrical surface of the plug 17 is in full contact with the entire inner cylindrical surface of cage unit 15a of the cage 15, thereby closing all orifices 24a. Therefore, the high-pressure-drop valve device is in its closed valve state, whereby the liquid at the inlet 11 does not flow out of the outlet 12.

When, as a result of the operation of the actuator transmitted through the stem 22, the plug 17 is lifted to a raised position, for example, as indicated by the single-dot chain line in FIG. 2, and the orifices 24a of the lowest line of the cage unit 15a are no longer covered by the plug 17 and are therefore opened. Consequently, the liquid which has entered the valve body 10 through the inlet 11 flows through the central open part of the valve seat 14 into the interior of the cage 15. The liquid in the space above the plug 17 is relieved through the small gap between the inner surface of the cage unit 15a and the plug 17. This fluid which has entered the interior of the cage 15 from inlet 11 then passes successively through the orifices 24a, holes 23a, orifices 24b, holes 23b, orifices 24c, holes 23c, orifices 24d, and holes 23d as it repeats contraction and expansion. During this passage, the liquid undergoes a great pressure reduction and flows out of the cage 15 and flows out of the valve body 10 through the outlet 12.

During this flow of the liquid, the liquid which has flowed into the interior of the cage 15 is reduced in pressure to a slight extent by a throttling section virtually formed between the valve seat 14 and the plug 17. The liquid then passes through the orifices 24a and first undergoes pressure reduction through these orifices 24a since they have relatively small diameters and function as throttling sections.

The liquid which has thus passed through the orifices 24a and reached the holes 23a collides with the inner wall surface of the cage unit 15b since the orifices 24b do not lie on the same line as the orifices 24a, thereby dissipating energy and being reduced in pressure.

The liquid within the holes 23a next flows through the orifices 24b and is thereby reduced in pressure and, at the same time, collides with the inner wall surface of the cage unit 15c at the holes 23b. Thereafter, pressure reduction is successively carried out in the same manner, and the liquid thus reduced in pressure flows out of the cage 15 through the holes 23d.

Thus, as the liquid passes through the cage units 15a through 15d in sequence, it is successively reduced in pressure in multiple stages (four stages in the instant case), and a high pressure difference or drop is attained between the pressure within the interior of the cage 15 and the pressure of its exterior. Since this pressure drop is effected successively in stages corresponding to the successive cage units 15a through 15d, there is no pressure reduction region of locally large pressure drop, and there is almost no possibility of cavitation, whereby erosion does not occur.

Then, when the plug 17 is lifted further, the number of orifices 24a in the inner wall surface of the cage 15 which are thereby exposed and no longer covered by the plug 17 increases, and the flowrate of the liquid flowing through the valve device increases.

Next, embodiments of the high-pressure-drop valve of the invention adapted to obtain desired flowrate characteristics will be described with reference to FIGS. 4 through 7.

Figure 5:
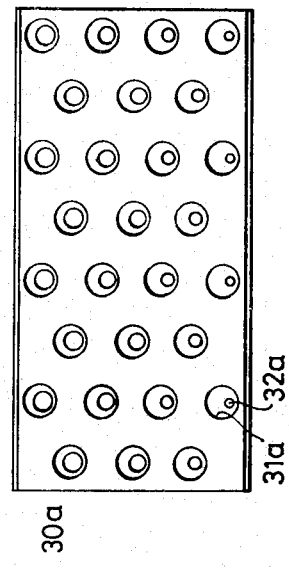
FIG. 5 is a developed elevation view showing one unit of the cage illustrated in FIG. 4.
Figure 4:
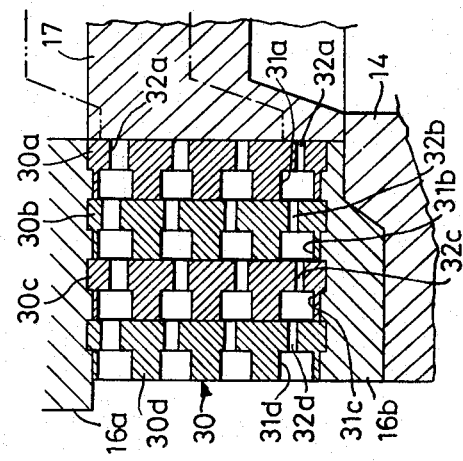
FIG. 4 is an elevation view, in longitudinal section, showing a part of a cage in a second embodiment of the high-pressure-drop valve according to the invention.

A longitudinal section of the cage portion of a second embodiment of the high-pressure-drop valve of the invention and a developed view of one cage unit thereof are respectively shown in FIGS. 4 and 5. Other parts of the instant embodiment are the same as corresponding parts in the above described first embodiment, and, therefore, repeated description and illustration thereof are omitted.

In this second embodiment, there is provided a cage 30 comprising four hollow cylindrical cage units 30a, 30b, 30c, and 30d having respectively different diameters and mutually fitted in concentric disposition and in a substantially liquid-tight manner. The cage unit 30a has a plurality of relatively large-diameter holes 31a and a plurality of relatively small-diameter orifices 32a communicating respectively with these holes, each combination of a hole 31a and an orifice 32a forming a through hole through the cylindrical wall of the cage unit 30a. Each orifice 32a communicates with its corresponding hole 31a at a lower part thereof. The positional relationships of the plurality of holes 31a are similar to those of the holes 23a in the preceding first embodiment. Accordingly, the holes 31a are so arranged that four holes are alined in each line in the horizontal (or line) direction, and there are seven lines spaced apart in the vertical direction.

In the second embodiment, while the orifices 32a in any one line are of the same diameter, the orifice diameter increases progressively from the line (the first line) of the lowermost stage, through the line (the second line) of the second stage from the bottom, and thus upward through the third line, the fourth line, and so on to the seventh line.

The cage unit 30c has the same construction as the cage unit 30a. In the cage units 30b and 30d, the orifices 32b and 32d thereof respectively communicate with their holes 31b and 31d at the upper parts thereof. The orifices 32b and 32d increase in diameter from the lowermost line upward to the highest line similarly as in the cage unit 30a.

Then, when the plug 17 is lifted from its position indicated in full lines to the position indicated by single-dot chain line, the liquid which has flowed into the inner side of the cage 30 enters the interior of the cage 30 through the orifice 32a and then passes successively through the hole 31a, the orifice 32b, the hole 31b, the orifice 32c, the hole 31c, the orifice 32d, and the hole 31d, thereby undergoing successive pressure reduction similarly as in the preceding first embodiment.

Figure 6:
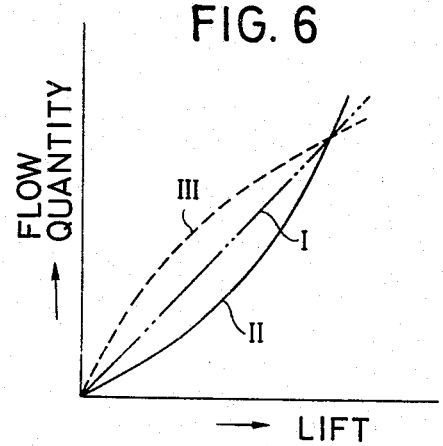
FIG. 6 is graph indicating flowrate characteristics of the high-pressure-drop valve according to the invention.
Figure 7:
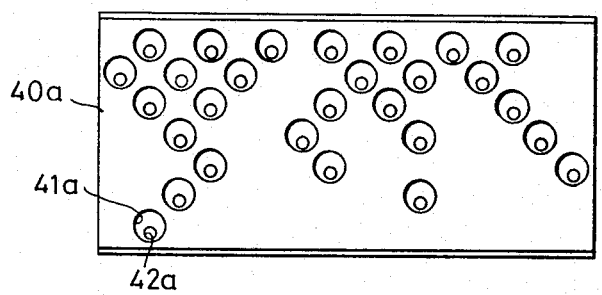
FIG. 7 is a developed elevation view showing one cage unit in a third embodiment of the high-pressure-drop valve according to the invention.

Then, as the plug 17 is lifted progressively from the stage indicated in single-dot chain line to the state indicated in two-dot chain line, the relationship between the flowrate and the quantity or distance of lift (or degree of opening) of the plug 17 is linear as indicated by line I in FIG. 6 in the case of the first embodiment. In the case of the second embodiment, however, since the diameter of the orifices 32a are made progressively larger from the bottom line to the higher lines, this relationship between the flowrate and the quantity of lift of the plug 17 is as indicated by curve II in FIG. 6. That is, in the region where the lift of the plug 17 is small, the variation of flowrate with lift is relatively small, but in a region where the lift is large, the variation of flowrate with lift is large.

Accordingly, since the variation of flowrate with lift of the plug 17 is small in a region of low flowrate, the accuracy of flowrate control is good.

In the above described second embodiment, the number of orifices in every line is made the same, and the diameter of the orifices is varied with different lines. Alternatively, however, the diameter of the orifices may be kept constant, and the number of orifices varied with different lines as indicated in the third embodiment illustrated in FIG. 7. In this embodiment shown in FIG. 7, a cage unit 40a is provided with orifices 42a communicating with respective holes 41a in a pattern wherein one combination of an orifice and a hole is provided in the lowest stage (first line), two combinations are provided in the second line, three combinations in the third line, and so on, to seven combinations in the seventh line.

By this arrangement of combinations of orifices 42a and respective holes 41a increasing upward line by line, a flowrate-lift characteristic as indicated by curve II in FIG. 6 is also obtained similarly as in the preceding second embodiment.

If, in the above described second embodiment, the diameter of the orifice 32a is made maximum in the lowermost stage or first line and is progressively decreased upward from line to line, or, in the above described third embodiment, the number of orifices 42a is made maximum at the lowermost stage first line and progressively decreased upward from line to line, the flowrate-lift characteristic will become as indicated by curve III in FIG. 6. In this case, in a region of low flowrate, the variation of flowrate with plug lift is large. Therefore, the flowrate at the initial period of valve opening is large, and, for this reason, the high-pressure-drop valve is suitable for use in cases where it is used to obtain a high pressure drop and, at the same time, as an ON-OFF control valve.

Further embodiments of the high-pressure-drop valve according to the invention in which still greater pressure drops can be attained, and, if a pressure drop is determined as a given pressure drop, a small number of cage units used will suffice, will now be described with reference to FIGS. 8 and 9.

Figure 8:
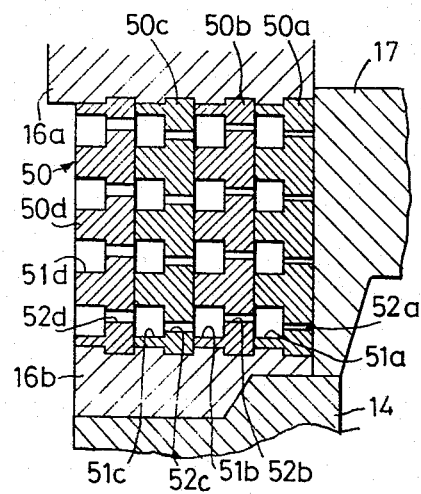
FIG. 8 is an elevation view, in longitudinal section, of a cage part of a fourth embodiment of the high-pressure-drop valve according to the invention.
Figure 9:
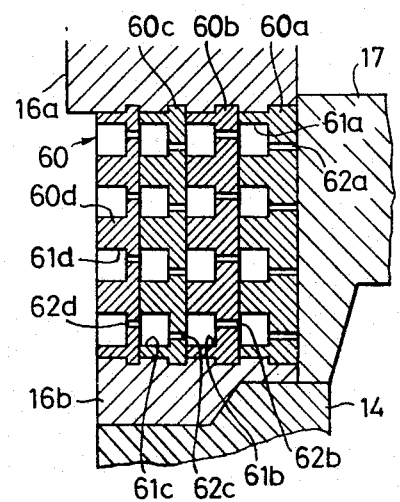
FIG. 9 is an elevation view, in longitudinal section, of a cage part of a fifth embodiment of the high-pressure-drop valve according to the invention.

In a fourth embodiment of the high-pressure-drop valve of the invention as illustrated in FIG. 8, there is provided a cage 50 comprising cage units 50a, 50b, 50c, and 50d. In these cage units 50a through 50d, there are respectively formed holes 51a through 51d and orifices 52a thorugh 52d communicating therewith in an arrangement pattern similar to that in the aforedescribed first embodiment.

The fourth embodiment differs from the aforedescribed first embodiment in that the diameters $d_1$, $d_2$, $d_3$, and $d_4$ respectively of the orifices 52a, 52b, 52c, and 52d of the cage units 50a through 50d are selected to have the relationship $d_1 < d_2 < d_3 < d_4$.

In the first embodiment, the pressure difference or drops $\Delta p_1$, $\Delta p_2$, $\Delta p_3$, and $\Delta p_4$ obtained respectively by the cage units 15a through 15d have the following relationship.

$$\Delta p_1 = \Delta p_2 = \Delta p_3 = \Delta p_4 = \Delta p.$$

Then, the total pressure drop $\Delta p_t$ obtained by the cage 15 becomes as follows.

$$\Delta p_t = n \Delta p,$$

where $n$ is the number of cage units, which is 4 in this case.

Then, in order to avoid the occurrence of cavitation in obtaining a pressure drop per cage unit, the pressure drop must be kept within a caviatation limit above which the pressure drop cannot be set. The pressure drop $\Delta p_c$ of this cavitation limit can be expressed by the following equation.

$$\Delta p_c = K^{p}{}_i,$$

where $k$ is a cavitation limit constant, and $p_i$ is the pressure of the liquid flowing into a single cage unit. Consequently, since $k$ is constant, the value of $\Delta p_c$ also decreases with decreasing value of $P_i$.

Accordingly, in the case where the orifices 24a through 24d of the cage units 15a through 15d are of the same diameter and length as in the aforedescribed first embodiment, the above mentioned pressure drop $\Delta p$ per cage unit must be selected at a small value in order to prevent the occurrence of cavitation even at the outermost cage unit 15d. In this case, only relatively small pressure drops are taken with respect to the other cage units in spite of their ample margin of cavitation limit. For this reason, in order to increase the total pressure drop $\Delta p_t$, the above mentioned number $n$ must be made large, that is, the number of cage units must be increased.

In contrast, in the fourth embodiment, the diameters of the orifices 52a through 52d of the cage units 50a through 50d are made successively different as described above, and each pressure drop per cage unit is taken near the cavitation limit.

Accordingly, the total pressure drop $\Delta p_t$ obtained with the cage 50 of the instant embodiment becomes as follows.

$$\Delta p_t = k (p_1+p_2+p_3+p_4),$$

where $p_1$, $p_2$, $p_3$, and $p_4$ respectively denote the pressures of the liquid flowing respectively into the cage units 50a, 50b, 50c, and 50d.

Since, in this manner, the orifice diameters are made different for each cage unit, and the pressure drop is made close to the cavitation limit for each cage unit, a total pressure drop $\Delta p_t$ of a large value can be obtained. Conversely if the total pressure drop $\Delta p_t$ is taken as being constant, a smaller number of cage units that in the case of the first embodiment will be sufficient.

While, in the above described fourth embodiment, the diameters of the orifices are made different for every cage unit, it is also possible, by the same conception, to make the lengths of the orifices different for every cage unit as in a fifth embodiment of the high-pressure-drop valve according to the invention described below with reference to FIG. 9.

In this fifth embodiment, there is provided a cage 60 comprising cage units 60a through 60d, in which holes 61a through 61d and respectively communicating orifices 62a through 62d are formed with the same positional relationship as in the aforedescribed first embodiment. In this embodiment, however, the lengths $l_1$, $l_2$, $l_3$, and $l_4$ of the orifices 62a through 62d, respectively, of the cage units 60a through 60d are so selected that they have the following relationship.

$$l_1 > l_2 > l_3 > l_4$$

Furthermore, these orifice lengths are so selected that the pressure drop attained per cage unit will be close to the cavitation limit similarly as in the preceding fourth embodiment. Since the other features of construction and function of this fifth embodiment are the same as corresponding features of the foregoing fourth embodiment, description thereof will omitted.

Further, this invention is not limited to these embodiments but various variations and modifications may be made without departing from the scope and spirit of the invention.

What we claim is:

1. A high-pressure-drop valve comprising: a valve body having a liquid inlet, a liquid outlet, and a valve chamber provided between and communicating with said inlet and outlet;

a cage of substantially hollow cylindrical shape fixedly accommodated within said valve chamber and comprising a plurality of cage units of hollow cylindrical shape having respectively different diameters and mutually fitted in a liquid-tight and concentric arrangement;

and a valve member fitted in the hollow interior of said cage and adapted to undergo slidable displacement therewithin, each of said cage units having a plurality of orifices opening at one cylindrical surface of the cage unit and a plurality of holes communicating respectively with said orifices and opening at the other cylindrical surface of the cage unit, said orifices of the cage units being formed to have mutual positional relationships such that the centerline of any orifice of any one cage unit does not coincide with the centerline of a corresponding orifice of a cage unit adjacent to said one cage unit, each of said holes having a diameter greater than that of each of the orifices in a manner communicable with the orifice of the adjacent cage, whereby liquid which has passed through each orifice and correspondings hole of said one cage unit first collides against the inner concave cylindrical surface of an adjacent cage unit and then flows from said hole into the corresponding orifice of said adjacent cage unit.

2. A high-pressure-drop valve as claimed in claim 1 in which the plurality of orifices of each cage unit are formed with mutually differing diameters in the direction of said slidable displacement of said valve member and the plurality of holes of each cage unit have the same diameter.

3. A high-pressure-drop valve as claimed in claim 1 in which said plurality of orifices of the plurality of cage units are so formed that the diameters of respectively corresponding orifices differ with each cage unit.

4. A high-pressure-drop valve as claimed in claim 1 in which said plurality of orifices of the plurality of cage units are so formed that the length of the respectively corresponding orifices differ with each cage unit.

5. A high-pressure-drop valve as claimed in claim 1 in which said orifices are formed to have respective openings at the inner concavely cylindrical surfaces of said cage units, while said holes communicating with the orifices are formed to have respective openings at the outer convex cylindrical surfaces of said cage units, and a liquid flowing through said liquid inlet into the valve body is directed into the hollow inner part of the hollow cylindrical cage, enters the innermost cage unit of the plurality of concentric cage units through the orifices thereof, and, passing successively through said orifices and holes of the intervening cage units, flows out of cage through the holes of the outermost cage unit.

* * * * *